(No Model.)
A. J. TREMPE.
WIRE UNWINDING REEL.
No. 352,962. Patented Nov. 23, 1886.
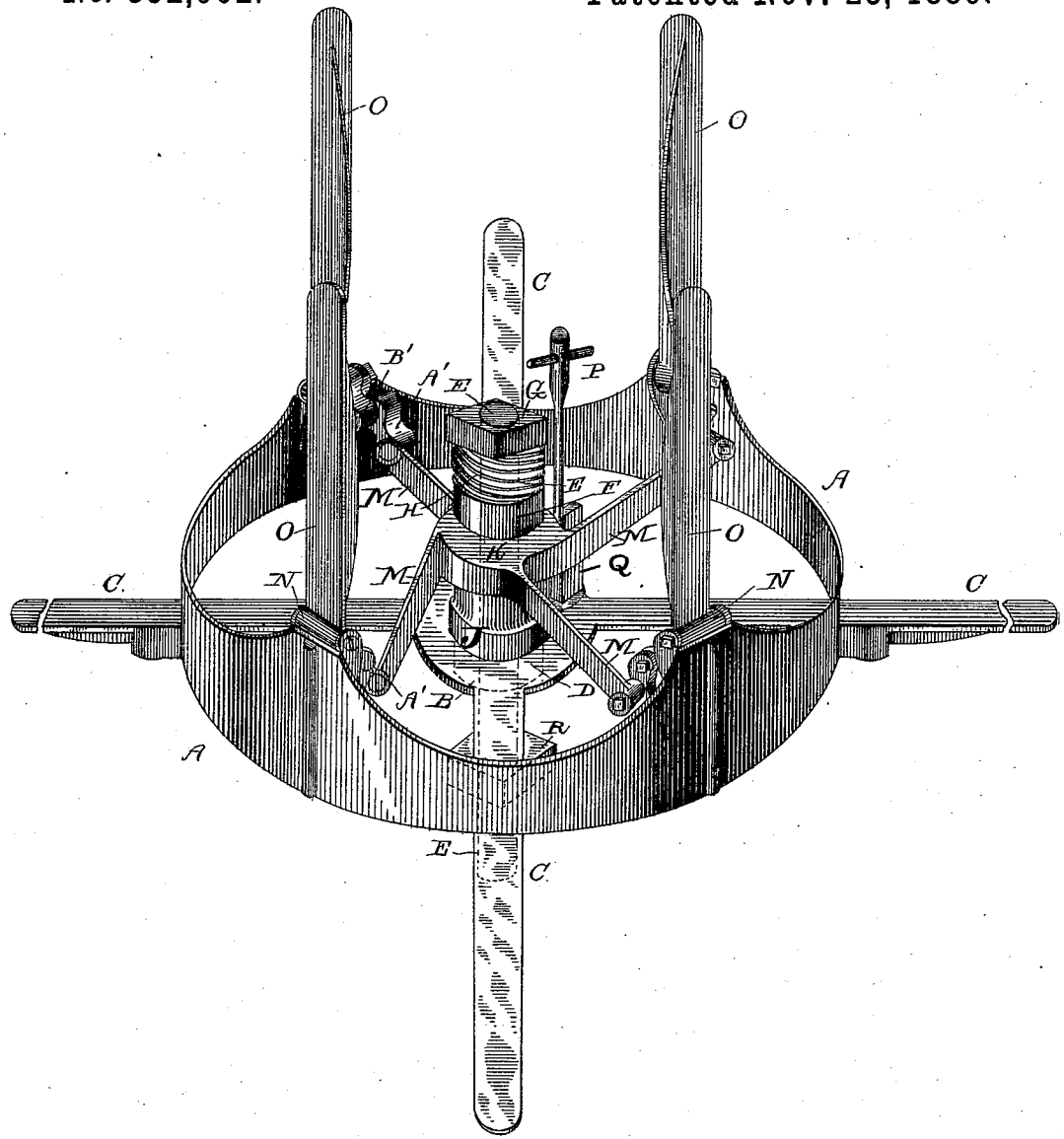
ATTEST:
O. Hough
C. E. Jones.
INVENTOR:
Alexis J. Trempe,
By A. O'Neill
Chas J Gooch
Attorney

UNITED STATES PATENT OFFICE.

ALEXIS J. TREMPE, OF ANSONIA, CONNECTICUT.

WIRE-UNWINDING REEL.

SPECIFICATION forming part of Letters Patent No. 352,962, dated November 23, 1886.

Application filed April 28, 1883. Serial No. 93,324. (No model.)

*To all whom it may concern:*

Be it known that I, ALEXIS J. TREMPE, a citizen of the United States, residing at Ansonia, in the county of New Haven and State of Connecticut, have invented certain new and useful Improvements in Reels for Holding Coils of Wire while being Unwound, of which the following is a specification, reference being had therein to the accompanying drawing.

This invention consists in certain improvements, as will be hereinafter described and claimed, in apparatus for holding reels or coils of wire while being uncoiled.

The accompanying drawing represents a perspective view of the apparatus.

This coil-holding device consists of an outer circular drum or disk, A, having outwardly-radiating arms C, which serve as supports for the wire as it is unreeled. These arms are formed integrally with or rigidly attached to the disk A, and extend outward from a central disk, B, in line with the bottom edge of the disk or drum A.

D represents a collar formed upon or rigidly secured to the lower portion of the rotating shaft or spindle E, which serves as a rest or support for the disk B. Through a central opening in the central disk, B, is passed the rotating shaft or spindle E, on which the reel rotates. On the upper end of this spindle E is a sleeve or ring, F, keyed to said spindle, so that it may slide upon it.

H represents a spiral spring which encircles the screw-threaded upper end of the shaft E, its lower end bearing upon the sleeve or ring F, keyed upon the shaft E; and G represents a nut which serves to keep said spring in position and also to compress it. The object of this spring is to regulate the speed and stop the rotation of the reel when the tension applied to uncoil the same has been relaxed. By compressing the spring the sleeve F is pressed down upon the tubular projection upon the disk B, causing sufficient friction between them to momentarily stop the rotation of the reel, as above stated, when it is desired for any purpose to discontinue the uncoiling of the wire. The frictional contact between the sleeve and tubular projection may be regulated by turning the nut down to increase and up to decrease the friction, so that the tension of the reel may be so regulated that the rotation of the reel may be either stopped or lessened or entirely unimpeded.

K represents a spider which at its center encircles and slides upon the tubular projection J. This spider has radial arms M, whose outer ends are by means of pivoted links A' connected with the inwardly-projecting ends B' of the arms O. These arms O have pivotal bearing at their inner ends within ears N, which project from the inner face of the drum A.

P represents a handle which is swiveled in the central disk, B, and is provided with a gate or flange, Q.

R represents a nut by means of which the lower end of the spindle E, when passed through a hole in a table, bench, or other suitable support, may be secured in position so as to hold the reel to such support with capability of its revolving as the wire is unwound.

When it is desired to unwind a reel or coil of wire, the operator first turns the gate or flange Q outward, as shown in the drawing. He then raises the arms O to the position shown in the drawing, which can be readily accomplished by grasping the outer ends of any two opposite arms and pulling upward thereon, whereupon the inner ends, B', of said arms will force down the links A', and with them force down the spider K and arms M. The wire coil is then slipped over the arms O, while thus raised and lowered, until it rests upon the arms C, with the interior of the coil encircling the drum A. He then draws down the arms O to a horizontal position, with their under faces above the top of the coil, by which means the coil will be held in position upon the bottom arms, C, and be prevented from rising upward, which it would do during the rotation of the drum A were the arms O absent. The handle P is then turned around to bring the gate or flange Q thereon beneath the spider-arms M, near which it is pivoted, thereby locking said spider in position, and also preventing the upward movement of the arms O.

Having thus described my invention, what I claim is—

1. In a reel for holding coils of wire while being unwound, the combination of the drum or disk A, having coil-supporting arms C, and pivoted coil-retaining arms O, as and for the purpose set forth.

2. The combination of drum A, shaft or spindle E, tubular projection J, spiral spring H, and nut G, substantially as and for the purpose set forth.

3. The combination of drum A, shaft or spindle E, tubular projection J, handle P, having flange or gate Q, spider K, having arms M, connected with said drum, and the links or arms O, substantially as and for the purpose set forth.

4. In a coil-holding device, the combination of drum A, having arms C, shaft or spindle E, tubular projection J, handle P, having flange or gate Q, spring H, nut G, spider K, having arms M, and links A', arms O, pivoted at N, substantially as and for the purpose set forth.

In testimony whereof I affix my signature in presence of two witnesses.

ALEXIS J. TREMPE.

Witnesses:
W. HITCHCOCK,
C. A. OAKS.